United States Patent
Mueller

(10) Patent No.: US 6,198,721 B1
(45) Date of Patent: Mar. 6, 2001

(54) METHOD AND SYSTEM FOR DATA TRANSMISSION IN A RING NETWORK

(76) Inventor: Horst Mueller, Dammsr. 11, 82069 Hohenschaeftlarn (DE)

( * ) Notice: Subject to any disclaimer, the term of this patent is extended or adjusted under 35 U.S.C. 154(b) by 0 days.

(21) Appl. No.: 09/027,418

(22) Filed: Feb. 23, 1998

(30) Foreign Application Priority Data

Feb. 21, 1997 (DE) .............................................. 197 07 056

(51) Int. Cl.$^7$ .............................. H04B 10/20; H04J 14/02
(52) U.S. Cl. ........................ 370/223; 370/535; 359/110; 359/119; 359/124; 359/128
(58) Field of Search ................... 359/115, 118, 359/119, 124, 110, 128; 370/216, 221, 222, 223, 224, 245, 225, 535, 907, 228

(56) References Cited

U.S. PATENT DOCUMENTS

| | | | |
|---|---|---|---|
| 5,576,875 | * 11/1996 | Chawki et al. | 359/125 |
| 5,760,934 | * 6/1998 | Sutter et al. | 359/119 |
| 5,867,289 | * 2/1999 | Gerstel et al. | 359/110 |
| 5,943,148 | * 8/1999 | Hamel et al. | 359/124 |
| 5,986,783 | * 11/1999 | Sharma et al. | 359/119 |
| 6,046,833 | * 4/2000 | Sharma et al. | 359/119 |

FOREIGN PATENT DOCUMENTS

| | | |
|---|---|---|
| 0 651 528 A1 | 10/1993 | (EP) . |
| 0 651 529 A1 | 10/1993 | (EP) . |
| 0 716 521 A2 | 10/1993 | (EP) . |
| 43 37 089 A1 | 10/1993 | (DE) . |
| 0 729 247 A2 | 2/1996 | (EP) . |
| 0 743 772 A1 | 5/1996 | (EP) . |

OTHER PUBLICATIONS

"First Results of an Experimental Coloured Section Ring", A. Jamel et al., pp. 3.51–3.54.
"Multiwavelength Survivable Ring Network Architectures", A.F. Elrefaie, pp. 1244/1251.

* cited by examiner

*Primary Examiner*—Ricky Ngo
(74) *Attorney, Agent, or Firm*—Bell, Boyd & Lloyd LLC

(57) ABSTRACT

A method and system for data transmission in a 2-fiber ring network having a plurality of network nodes wherein working signals are bidirectionally transmitted between terminal multiplexers and add/drop multiplexers on a part of the network and wherein protection signals are bidirectionally transmitted over the other part of the network; only one wavelength being required for one working connection and one appertaining protection connection.

7 Claims, 6 Drawing Sheets

METHOD AND SYSTEM FOR DATA TRANSMISSION IN A RING NETWORK

BACKGROUND OF THE INVENTION

1. Field of the Invention

The present invention is directed to a method for data transmission in a ring network and to a system suitable therefor. More specifically, the present invention is directed to a method for data transmission in a 2-fiber ring network with a plurality of network nodes wherein working signals are bidirectionally transmitted between terminal multiplexers and add-drop multiplexers on the ring network and wherein protection signals are bidirectionally transmitted over other parts of the ring network.

2. Description of the Prior Art

The report of the ICC '93 IEEE, 2/1993, pages 1245 through 1251 reveals optical communication networks with different ring structures that employ wavelength-division multiplex methods in signal transmission. Patent applications DE 43 37 089 A1, E 0651529 and E 0651528 A1 disclose optical ring networks wherein signal transmission occurs in a wavelength-division multiplex mode, whereby signals allocated to individual, specific wavelengths can be coupled out and coupled in. In a way which is known, these ring networks can be equipped with a monitoring ring in addition to what is referred to as a working ring.

The contribution "First results of an experimental Coloured Section Ring" in '22 European Conference on Optical Communication—ECOC-96", Oslo, WeB.2.3, page 3.51 to page 3.54 reports about a ring structure that is shown in FIG. 1. Such structure bidirectionally connects add/drop multiplexers, which neighbor one another, to one another via two light waveguides—one light waveguide being provided for each transmission direction. Only a single wavelength is used for the transmission between two add/drop multiplexers, whereas, however, different wavelengths are used on all other transmission sections.

The infeed and outfeed of signals occurs via optical add/drop multiplexers (OADMs) that correspond to optical filters (FIGS. 3, 4 and 5). This structure was tested for SDH connections (Synchronous Digital Hierarchy). Modern data networks should both enable point-to-point connections of terminal multiplexers and enable the operation of add/drop multiplexers which are connected to one another in a ring-like fashion. An alternate circuit is absolutely required. Further, optimally short switchover times should be achieved in case of malfunction.

SUMMARY OF THE INVENTION

In an embodiment of the present invention, a method for data transmission in a 2-fiber ring network is disclosed wherein the network has a plurality of network nodes such that each network node contains a terminal multiplexer and/or an add/drop multiplexer, and wherein the method includes the steps of: bidirectionally transmitting first working signals between first and second terminal multiplexers of different network nodes via a first working connection over separate light waveguides on a first portion of the network; bidirectionally transmitting first protection signals between the first and second terminal multiplexers via a first protection connection on a second portion of the network wherein a first wavelength is employed for the first protection connection which differs from other wavelengths respectively employed for other protection connections between other terminal multiplexers; bidirectionally transmitting second working signals between first and second add/drop multiplexers of different network nodes via a second working connection over separate first and second light waveguides; and bidirectionally transmitting second protection signals between the first and second add/drop multiplexers via a second protection connection existing over the second portion of the network, wherein a second wavelength is employed for the second protection connection between the first and second add/drop multiplexers which differs from other wavelengths respectively employed for other protection connections between other add/drop multiplexers.

In an embodiment, the method further comprises the step of: transmitting and receiving both the first working signals and the first protection signals over the first wavelength.

In an embodiment, the method further comprises the steps of: supplying different wavelengths to respective connector modules of both terminal multiplexers and add/drop multiplexers via a plurality of wavelength-division multiplex units; providing a plurality of switch devices wherein each switch device is associated with a signal wavelength-division multiplex unit; and selecting a signal having a specific wavelength with each switch device.

In an embodiment, the method further comprises the steps of: providing a monitoring and control assembly in each terminal multiplexer and in each add/drop multiplexer; sensing a disrupted working signal with the monitoring and control assembly; and switching to a protection signal upon the sensing of a disrupted working signal.

In another embodiment of the present invention, a system for data transmission in a 2-fiber ring network is disclosed which includes a plurality of network nodes, first and second light waveguides connecting the plurality of network nodes wherein the first and second light waveguides respectively include opposing transmission directions, a plurality of terminal multiplexers and a plurality of add/drop multiplexers located at the network nodes, a plurality of wavelength-division multiplexer units wherein each wavelength-division multiplexer unit is located at a network node for the outfeed and infeed of signals having specific wavelengths, a plurality of working connector modules wherein each module is associated with either a terminal multiplexer or an add/drop multiplexer and wherein the working connector modules are bidirectionally connected to one another over both the first and second light waveguides, and a plurality of protection connector modules wherein each connector module is associated with a terminal multiplexer or an add/drop multiplexer and wherein the protection connector modules are connected to one another over a second part of the network.

In an embodiment of the system, corresponding working connector modules and protection connector modules receive and transmit signals having the same wavelength.

In an embodiment, the system further includes a plurality of switch devices wherein each switch device is provided in a wavelength-division multiplexer unit for selecting signals having a specific wavelength.

In an embodiment, the system further includes a plurality of monitoring and control assemblies wherein each assembly is located in an add/drop multiplexer for controlling signals.

Additional features and advantages of the present invention are described in, and will be apparent from, the detailed description of the presently preferred embodiments and from the drawings

DETAILED DESCRIPTION OF THE PREFERRED EMBODIMENTS

Figure 1:
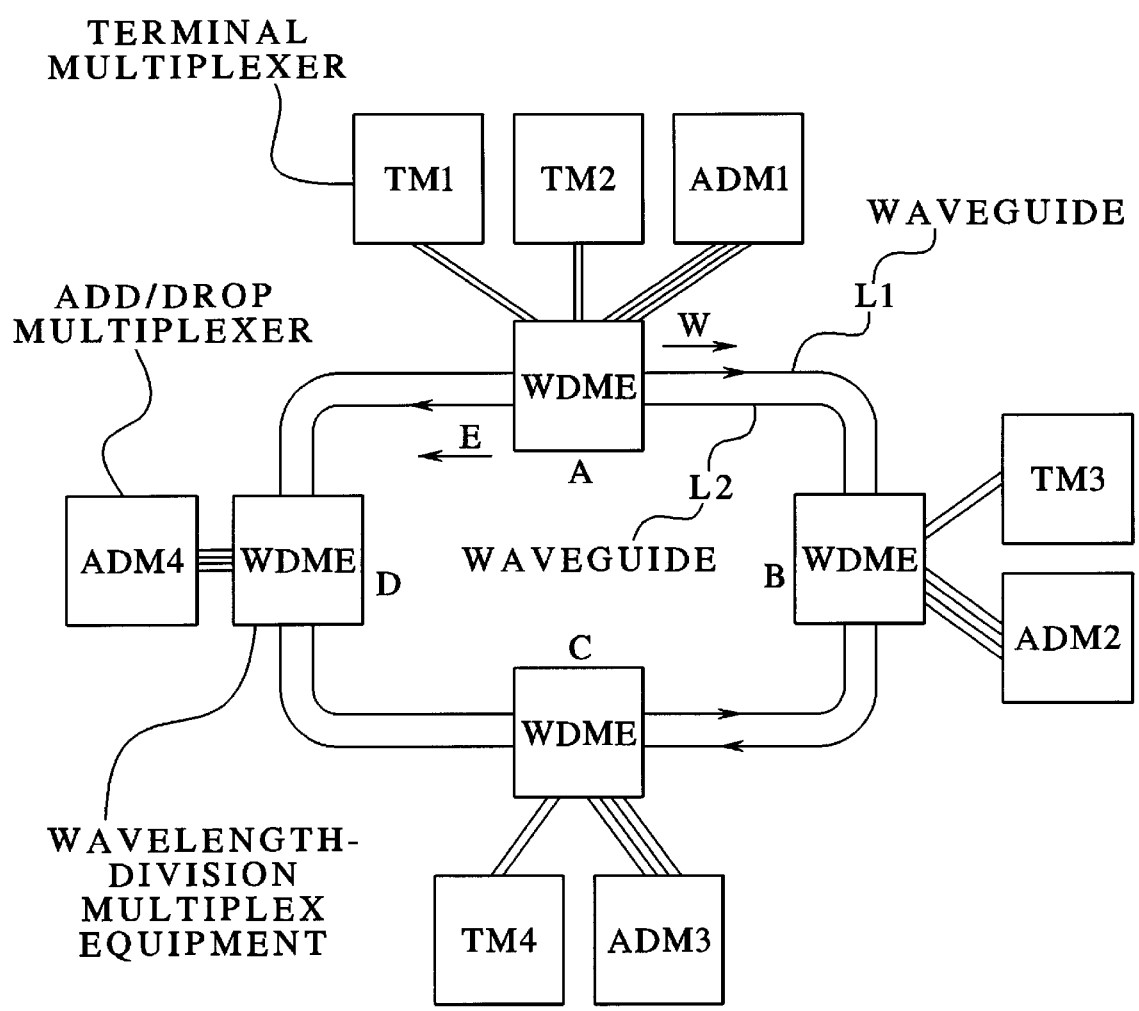
FIG. 1 shows an embodiment of a known 2-fiber ring network.

FIG. 1 shows a 2-fiber ring network constructed with two light waveguides L1 and L2. The transmission directions are separated so that the transmission occurs in a first transmission direction W in the first light waveguide L1 and the transmission occurs in the other direction E in the second light waveguide L2. The ring network contains four network nodes A, B, C and D with terminal multiplexers TM and add/drop multiplexers ADM, generally, connected via wavelength-division multiplex equipment WDME to the light waveguides. A bidirectional data exchange in a point-to-point mode occurs between the terminal multiplexers TM.

Figure 2:
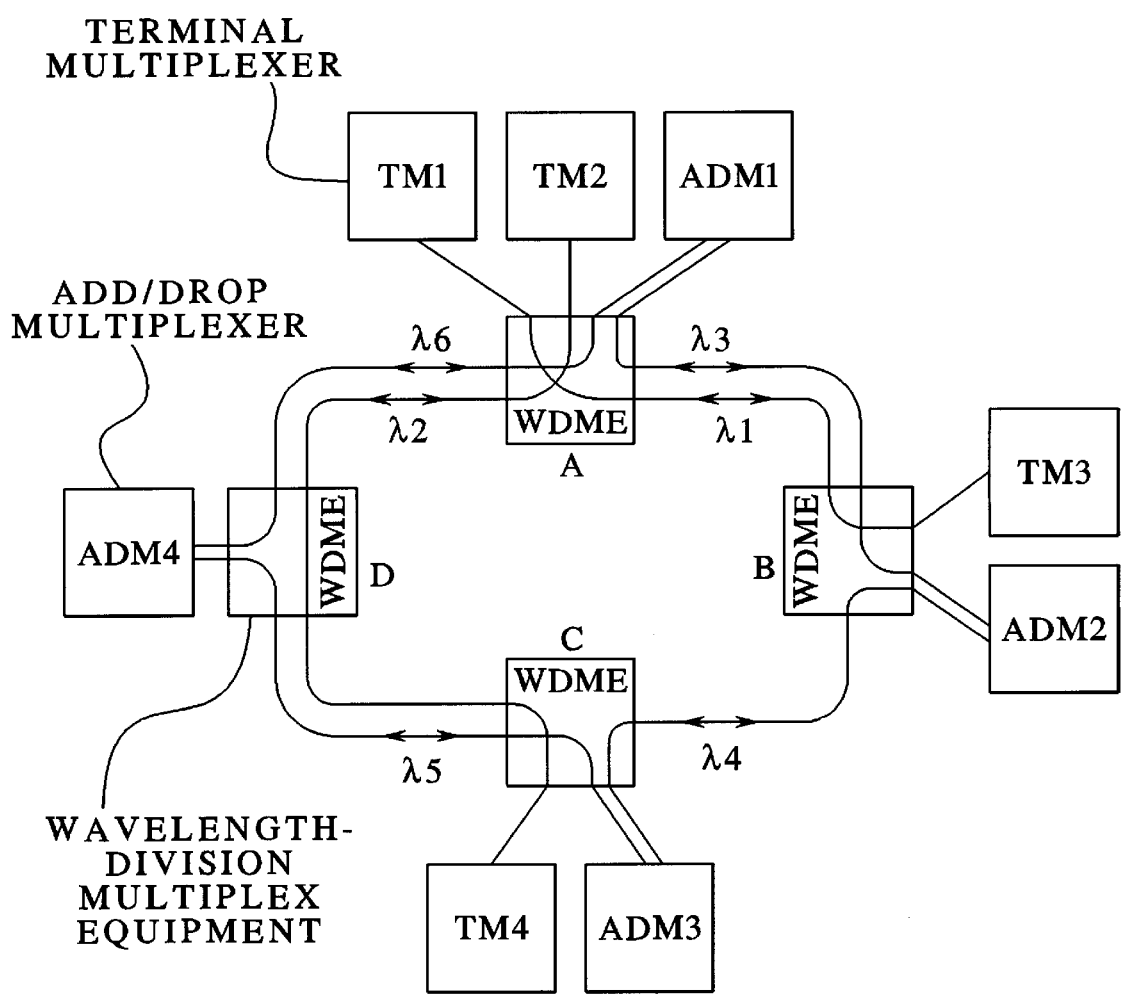
FIG. 2 shows working connections between terminals and between add/drop multiplexers of an embodiment of the present invention.

For reasons of clarity, only the logical working connections are shown in FIG. 2. As already set forth above, the transmission in each direction occurs via a separate light waveguide. The same wavelength is employed on both light waveguides for the transmission between two respective terminal multiplexers. Other logical connections of further terminal multiplexers use a different wavelength.

Figure 3:
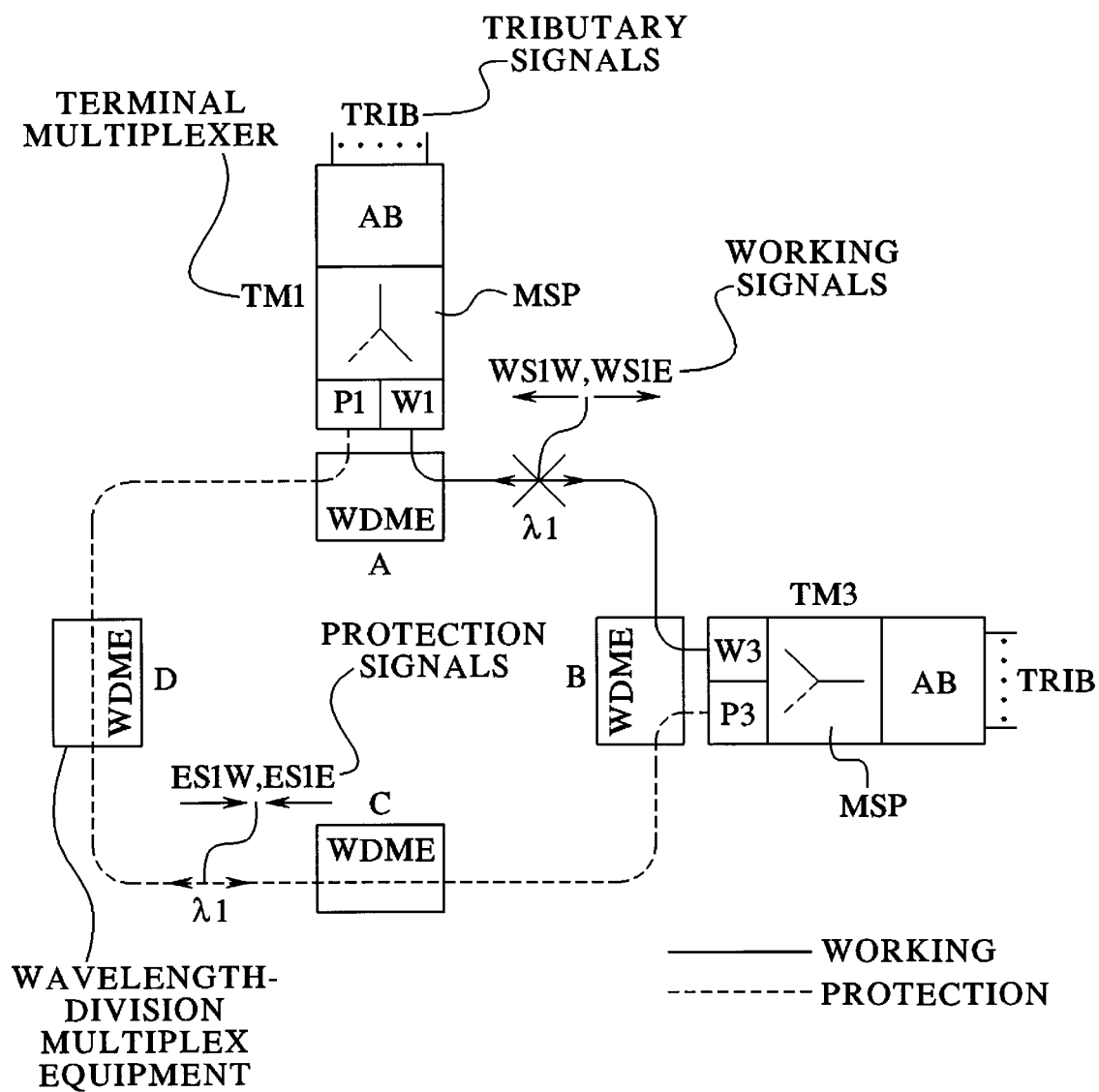
FIG. 3 shows an alternate circuit for two terminals given a malfunctioning line section.

Thus, the first terminal multiplexer TM1 is connected to the terminal multiplexer TM3 over the wavelength λ1; the working signals WS1E and WS1W are transmitted between the two multiplexers (see FIG. 3). Here, the terminal multiplexer TM2 is connected to the terminal multiplexer TM4 over the wavelength λ2, etc. The transmission in the two directions via separate light waveguides with the same wavelength is advantageous, particularly for organizational reasons. A protection connection (protection/alternate connection) also belongs to each working connection, this being realized with the same wavelength over the other part of the ring network.

Neighboring add/drop multiplexers ADM1 and ADM2, ADM2 and ADM3, ADM3 and ADM4 are also respectively connected to one another in the ring network over further, different wavelengths λ3 through λ6. The same wavelength is again preferably employed in both transmission directions for each bidirectional connection. A protection connection is likewise provided for each working connection in case of malfunction.

This is explained in greater detail with respect to FIG. 3. The working connection between the terminal multiplexer TM1 and the terminal multiplexer TM3 is disrupted in both directions. The same data—as protection signals with the same wavelength λ1—is also transmitted between these terminal multiplexers over the undisturbed part of the ring network, wherein the protection connection is shown with broken lines. In contrast to the working signals, the protection signals are respectively output in the other transmission direction and are received from the other transmission direction. The connector modules for the working signals are referenced with a W and those for the protection signals are referenced with a P as well as a numeral that indicates the multiplexer.

In order to keep the switching times and, thus, the data loss optimally low, the parallel data transmission via the protection connections occurs constantly, so that, given a malfunction, a switch merely has to be made to the undisturbed reception data. A complicated switching protocol becomes superfluous. The monitoring and switching means is referred to as multiplex section protection.

A cyclical interchange of the wavelengths employed is possible. Thus, the connection between two multiplexers can also occur with different wavelengths in each transmission direction. Given a ring network with two logical connections between two pairs of terminal multiplexers as in FIG. 2, the wavelength of the received working signal is then used for transmitting the protection signal. This, however, is more likely to result in organizational disadvantages.

Figure 4:
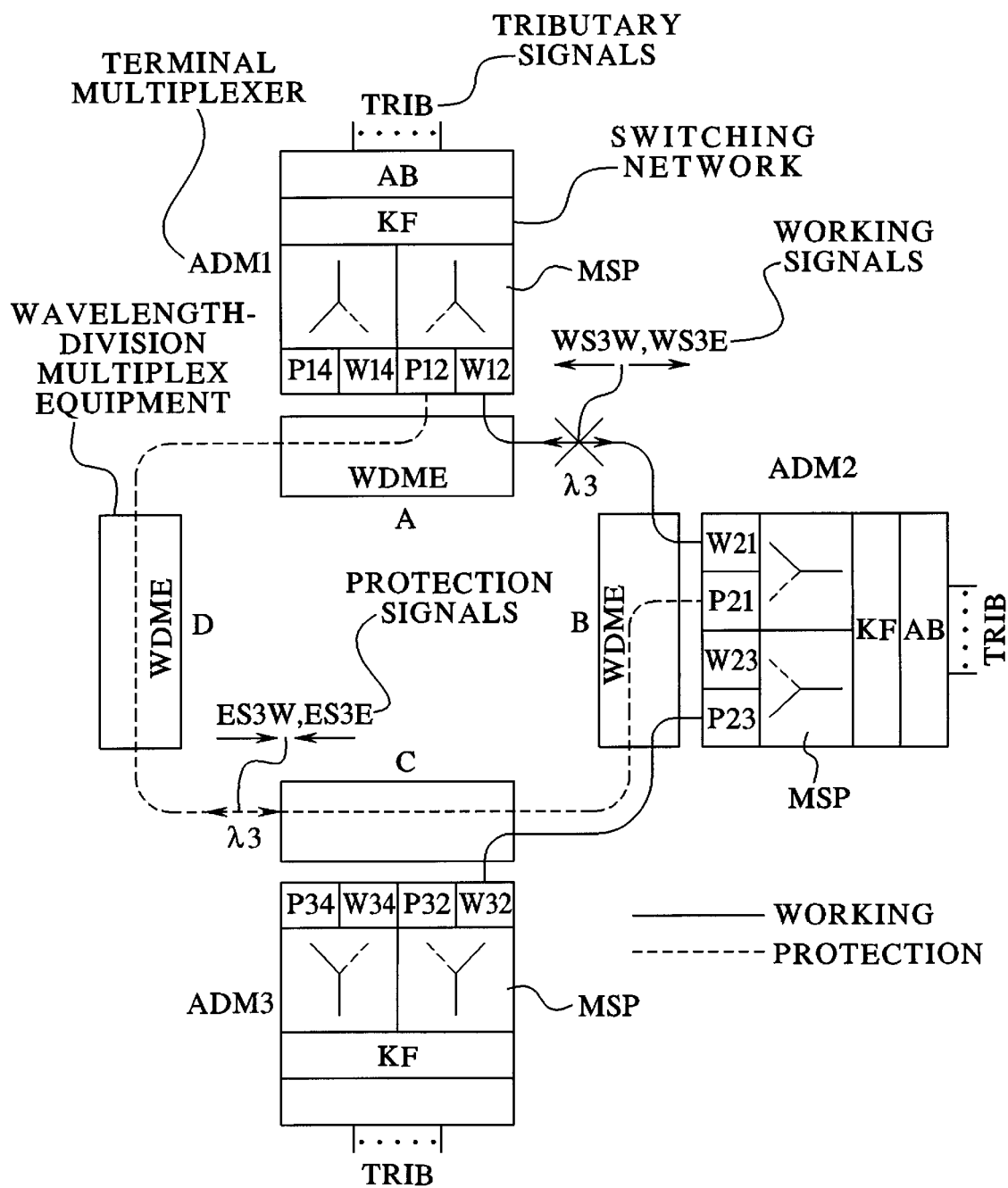
FIG. 4 shows an embodiment of the alternate circuit between two add/drop multiplexers.

The same malfunction is explained in FIG. 4 for the add/drop multiplexers. The working signals WS3E and WS3W cannot be transmitted between the add/drop multiplexers ADM1 and ADM2. The protection connection occurs via the undisturbed part of the ring network pursuant to which the protection signals ES3E, ES3W are constantly transmitted on the basis of the same wavelength λ3 and whereby the protection signals ES3E and ES3W are looped through the network nodes C and D. The switching between working connection and protection connection again ensures on the basis of the evaluation of the reception signal.

Since data is only transmitted between neighboring add/drop multiplexers, it is not absolutely necessary to employ different wavelengths on the different line sections. All working connections could thus occur with the wavelength λ3. However, different wavelengths are required for the protection connections anyway, so that the same wavelength should also be selected for the transmission of the working and protection signals for organizational reasons.

The add/drop multiplexers additionally include a switching network KF in order to be able to arbitrarily couple out and insert or, respectively, through-connect the input and output signals TRIB (tributary signals). The add/drop multiplexer ADM1 is also connected to the add/drop multiplexer ADM3 by logical connections over the add/drop multiplexer ADM2. The working connector module W12 of the add/drop multiplexer ADM1 is connected to the working connector module W21 of the add/drop multiplexer ADM2 over the wavelength λ3. In the add/drop multiplexer ADM2, the tributary signals of the network nodes A and C are then through-connected from the working connector module W21 to the working connector module W23 in the switching network of the add/drop multiplexer ADM2 and the proceed to the working connector module W32 of the add/drop multiplexer ADM3 with the wavelength λ4.

Figure 5:
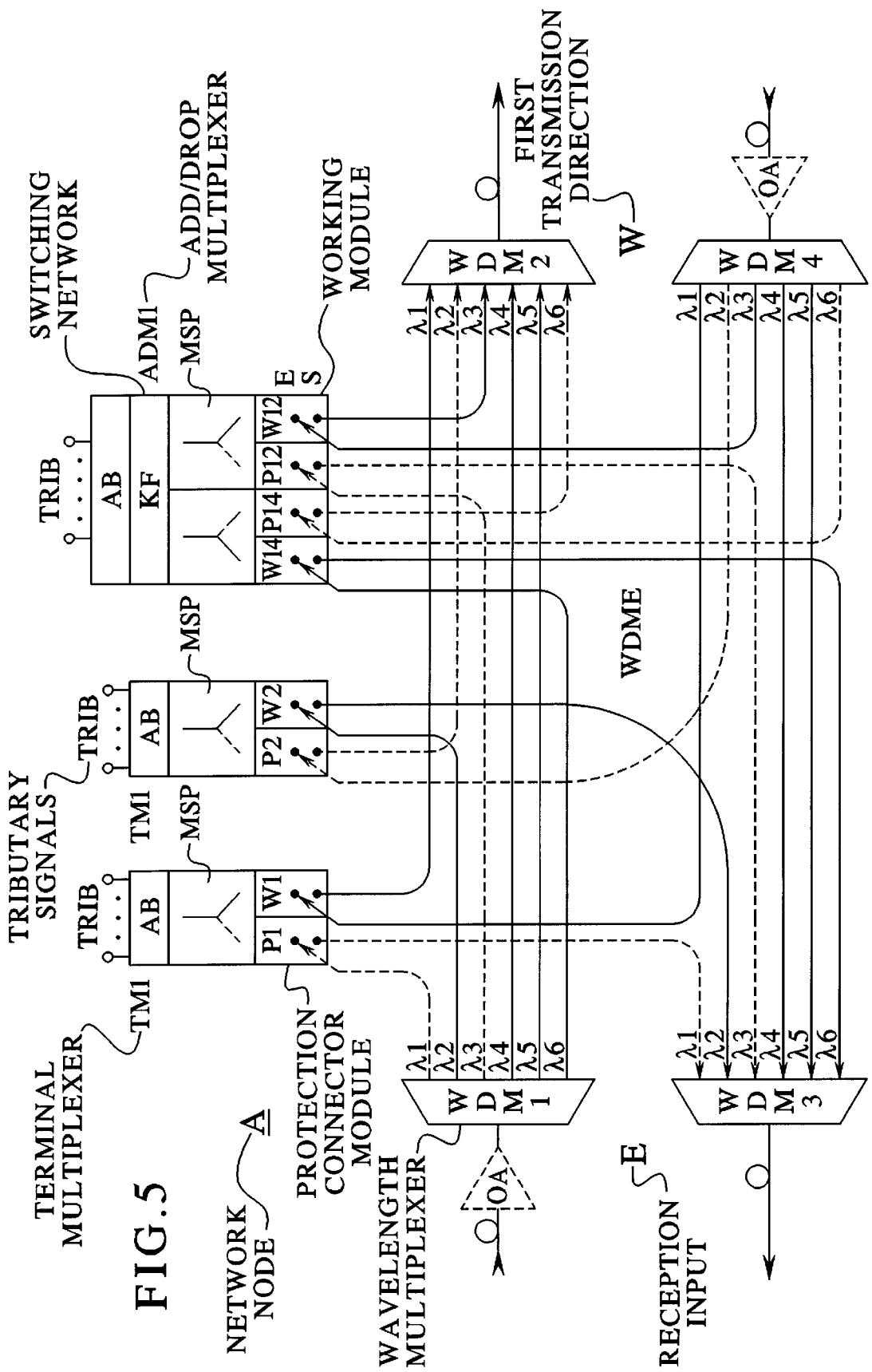
FIG. 5 shows a network node with a wavelength-division multiplexer, two terminal multiplexers and an add/drop multiplexer.
Figure 6:
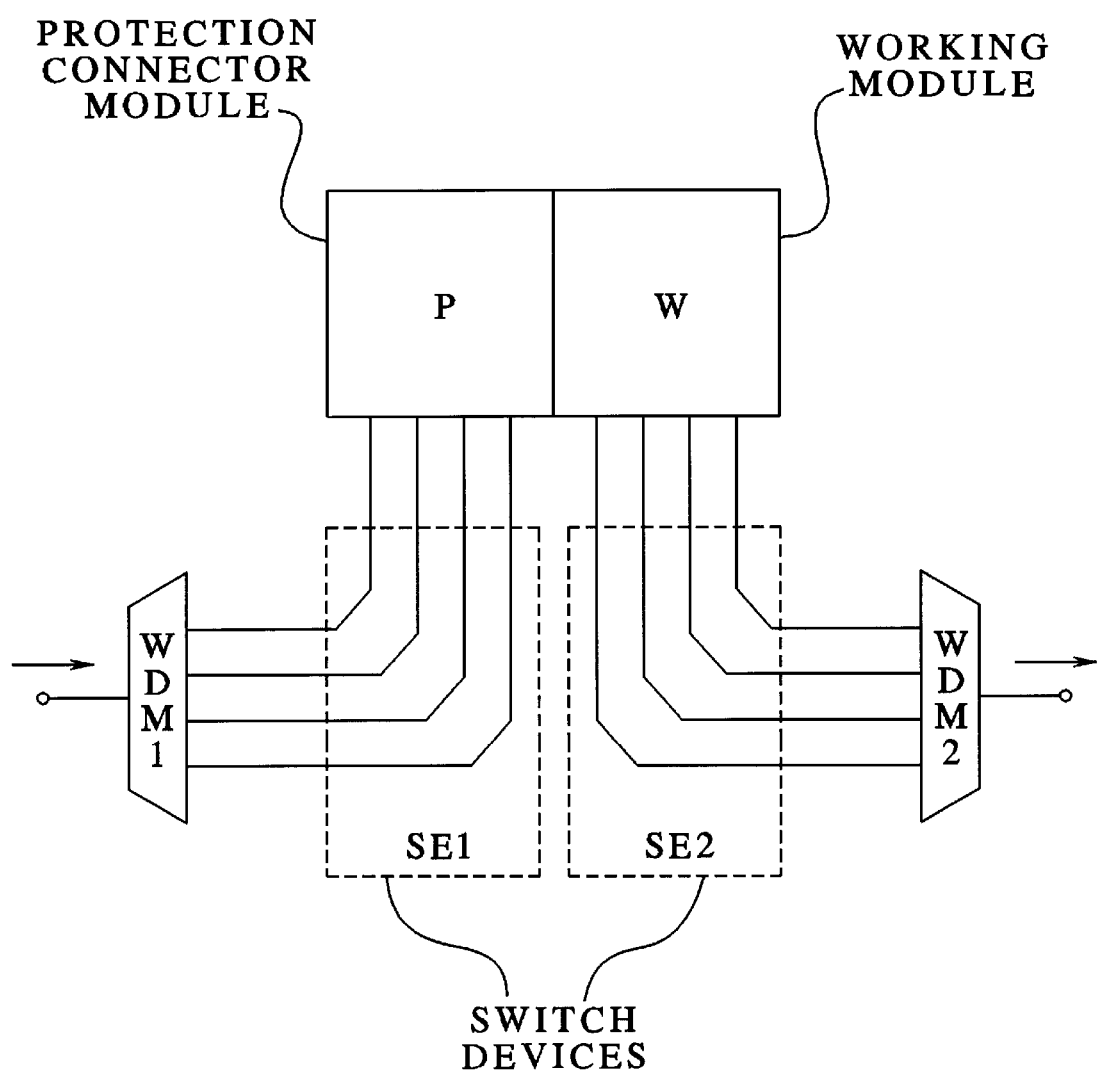
FIG. 6 shows a wavelength-division multiplexer with switch devices.

Since, as already set forth, only the switching from the working connector module W21 to the protection connector module P21 is implemented in case of malfunction, the setting of the switching network is not affected by this. The switching is therefore not delayed by the switching network. As an example, FIG. 5 shows the network node A with its wavelength-division multiplexer unit WDME and its multiplexers TM1, TM2 and ADM1 in greater detail. The wavelength-division multiplexer unit is composed of a plurality of wavelength multiplexers WDM1 through WDM4 that contain optical filters for the selection or for the merging of signals with different wavelengths λ1 through λ6.

According to FIG. 5, the terminal multiplexer 1 is connected to the terminal multiplexer TM3. As such, the send output S of the working connector module W1 is connected to the wavelength-division multiplexer WDM3 via which data is sent to the terminal multiplexer TM3 with the wavelength λ1 in the first transmission direction W. The reception input E of the working module W1 is connected to the wavelength-division multiplexer WDM4 that receives the working signals sent from the terminal multiplexer TM3 with the wavelength λ1. Accordingly, the transmission and reception terminals of the protection connector module P1 are connected to outputs of the wavelength-division multiplexer WDM1 or, respectively, WDM3 and are shown with broken lines for the sake of clarity.

Also as indicated in FIG. 5, the terminals of the working module and of the protection module of the second terminal multiplexer TM2 are connected to the wavelength-division multiplexers, but transmit all signals with the wavelength λ2. As already mentioned, the switching between protection and working reception signals occurs with the monitoring and switching module MSP. The signals TRIB are received or sent via connector modules AB. The add/drop multiplexer ADM1 is connected to its two neighboring add/drop multiplexers ADM2 and ADM4. It therefore includes two working connector modules, two protection connector modules and two monitoring

I claim as my invention:

1. A method for data transmission in a 2-fiber ring network having a plurality of network nodes wherein each network node contains a terminal multiplexer and/or an add/drop multiplexer, which are connected via wavelength division multiplex units to the 2-fiber ring network, the method comprising the steps of:

bidirectionally transmitting first working signals between a first terminal multiplexer and a second terminal multiplexer respectively of different network nodes via a first working connection over separate first and second light waveguides on a first portion of the network;

bidirectionally transmitting first protection signals between the first and second terminal multiplexers via a first protection connection on a second portion of the network wherein a first wavelength is employed for the first protection connection which differs from other wavelengths respectively employed for other connections between other multiplexers on the first portion of the network;

bidirectionally transmitting second working signals between a first add/drop multiplexer and a second add/drop multiplexer respectively of different network nodes via a second working connection over the separate first and second light waveguides; and bidirectionally transmitting second protection signals between the first and second add/drop multiplexers via a second wavelength is employed for the second protection connection between the first and second add/drop multiplexers which differs from other wavelengths respectively employed for other connections between other add/drop multiplexers on the second portion of the network.

2. A method for data transmission as claimed in claim 1, further comprising the step of:

transmitting and receiving both the first working signal and the first protection signal over the first wavelength and both the second working signal and the second protection signal over the second wavelength; and transmitting and receiving further working signals and protection signals over a same wavelength said same wavelength being unique for each connection between two terminals.

3. A method of data transmission as claimed in claim 1, further comprising the steps of:

supplying different wavelengths to respective connector modules of both terminal multiplexers and add/drop multiplexers via a plurality of wavelength-division multiplex units;

providing a plurality of switch devices, each switch device associated with a single wavelength-division multiplex unit; and selecting a signal having a specific wavelength with each switch device.

4. A method for data transmission as claimed in claim 1, further comprising the steps of:

providing a monitoring and control assembly in each terminal multiplexer and in each add/drop multiplexer;

sensing a disrupted working signal with the monitoring and control assembly; and switching to a protection signal upon the sensing of a disrupted working signal.

5. A system for data transmission in a 2-fiber ring network, comprising:

a plurality of network nodes;

first and second light waveguides connecting the plurality of network nodes, the first and second light waveguides respectively having opposing transmission directions;

a plurality of terminal multiplexers located at the network nodes;

a plurality of wavelength-division multiplexer units, each wavelength-division multiplexer unit located at a network node for the outfeed and infeed of signals having specific wavelengths;

a plurality of working connector modules, each working connector module associated with either a terminal multiplexer or an add/drop multiplexer wherein the working connector modules are bidirectionally connected to one another over both the first and second light waveguides; and a plurality of protection connector modules, each protection connector module associated with a terminal multiplexer or an add/drop multiplexer wherein the protection connector modules are connected to one another over a second part of the network; and wherein corresponding working connector modules and protection connector modules receive and transmit signals having the same wavelength.

6. A system for data transmission as claimed in claim 5, further comprising:

a plurality of switch devices, each switch device provided in a wavelength-division multiplexer unit for selecting signals having a specific wavelength.

7. A system for data transmission as claimed in claim 5, further comprising:

a plurality of monitoring and control assemblies, each monitoring and control assembly located in an add/drop multiplexer for controlling signals.

* * * * *